United States Patent
Lau et al.

(10) Patent No.: US 10,877,294 B2
(45) Date of Patent: *Dec. 29, 2020

(54) CONTACT LENS COMPRISING NON-COAXIAL LENSLETS FOR PREVENTING AND/OR SLOWING MYOPIA PROGRESSION

(71) Applicant: Johnson & Johnson Vision Care, Inc., Jacksonville, FL (US)

(72) Inventors: Manwai Charis Lau, Jacksonville, FL (US); Noel Brennan, Ponte Vedra, FL (US); Khaled Chehab, Jacksonville, FL (US); Xu Cheng, St. Johns, FL (US); Michael Collins, Jollys Lookout (AU); Brett Davis, Holland Park (AU); Eric R. Ritchey, St. Johns, FL (US); Fan Yi, Everton Park (AU)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/747,166

(22) Filed: Jun. 23, 2015

(65) Prior Publication Data

US 2016/0377884 A1    Dec. 29, 2016

(51) Int. Cl.
G02C 7/02 (2006.01)
G02C 7/04 (2006.01)
G02C 7/08 (2006.01)
G02C 7/06 (2006.01)

(52) U.S. Cl.
CPC ............ *G02C 7/022* (2013.01); *G02C 7/041* (2013.01); *G02C 7/06* (2013.01); *G02C 2202/24* (2013.01)

(58) Field of Classification Search
CPC .......... G02C 7/022; G02C 7/041; G02C 7/06; G02C 2202/24
USPC .............................. 359/619–628; 351/159.79
See application file for complete search history.

(56) References Cited

U.S. PATENT DOCUMENTS

| | | | |
|---|---|---|---|
| 5,024,517 A | 6/1991 | Seidner | |
| 5,748,375 A | 5/1998 | Yamana | |
| 6,554,424 B1 * | 4/2003 | Miller | A61F 2/145 351/159.01 |
| 7,997,727 B2 | 8/2011 | Ho | |
| 2007/0296916 A1 * | 12/2007 | Holden | G02C 7/042 351/159.08 |
| 2008/0309882 A1 | 12/2008 | Thorn | |

(Continued)

FOREIGN PATENT DOCUMENTS

| | | | | |
|---|---|---|---|---|
| CN | 104678572 A * | 6/2015 | | G02C 7/02 |
| CN | 104678572 A | 6/2015 | | |

(Continued)

OTHER PUBLICATIONS

European Search Report for corresponding EPA No. 16175689.5 dated Feb. 22, 2018.

*Primary Examiner* — William R Alexander
*Assistant Examiner* — Ephrem Z Mebrahtu

(57) ABSTRACT

Contact lenses incorporating an array of non-coaxial lenslets with add power that create non-coaxial myopic defocus within the optic zone of the lens may be utilized to prevent and/or slow myopia progression. The positive, non-coaxial lenslets cover about twenty to eighty percent of the central pupil area to deliver positive foci of light in front of the retina to slow the rate of myopia progression.

11 Claims, 12 Drawing Sheets

(56) References Cited

U.S. PATENT DOCUMENTS

| | | |
|---|---|---|
| 2011/0001923 A1 | 1/2011 | Phillips |
| 2012/0062836 A1 | 3/2012 | Tse |
| 2012/0113386 A1* | 5/2012 | Back .................. G02C 7/04 351/159.13 |
| 2012/0194780 A1* | 8/2012 | Back .................. G02C 7/041 351/159.73 |
| 2012/0320333 A1* | 12/2012 | Holden ............... G02C 7/041 351/159.05 |
| 2013/0293834 A1 | 11/2013 | Wang |
| 2014/0211147 A1 | 7/2014 | Wei et al. |
| 2014/0347622 A1* | 11/2014 | Wu ..................... G02C 7/044 351/159.13 |
| 2015/0160477 A1 | 6/2015 | Dai |
| 2016/0000314 A1* | 1/2016 | Drobe .................. G02C 7/00 351/246 |
| 2017/0008240 A1* | 1/2017 | Miller ............. B29D 11/00125 |
| 2017/0184875 A1 | 6/2017 | Newman |

FOREIGN PATENT DOCUMENTS

| | | |
|---|---|---|
| EP | 107444 A2 | 5/1984 |
| EP | 3112925 | 1/2017 |
| WO | WO2005055891 A1 | 6/2005 |
| WO | WO2006004440 A2 | 1/2006 |
| WO | WO2013113798 | 8/2013 |
| WO | WO2013185263 | 12/2013 |
| WO | WO2015147758 A1 | 10/2015 |
| WO | WO2016168746 | 10/2016 |
| WO | WO2018076057 | 5/2018 |

\* cited by examiner

CONTACT LENS COMPRISING NON-COAXIAL LENSLETS FOR PREVENTING AND/OR SLOWING MYOPIA PROGRESSION

BACKGROUND OF THE INVENTION

1. Field of the Invention

The present invention relates to ophthalmic lenses, for example, single vision and/or astigmatic lenses, and more particularly, to contact lenses designed to slow, retard or prevent myopia progression. The ophthalmic lenses of the present invention comprise positive, non-coaxial lenslets that provide, at any vergence distance, a myopia progression stop signal throughout the central, near and far periphery of the retina for preventing and/or slowing myopia progression while maintaining clear central vision.

2. Discussion of the Related Art

Common conditions which lead to reduced visual acuity are myopia and hyperopia, for which corrective lenses in the form of spectacles, or rigid or soft contact lenses, are prescribed. The conditions are generally described as the imbalance between the length of the eye and the focus of the optical elements of the eye, myopic eyes focusing in front of the retinal plane and hyperopic eyes focusing behind the retinal plane. Myopia typically develops because the axial length of the eye grows to be longer than the focal length of the optical components of the eye, that is, the eye grows too long. Hyperopia typically develops because the axial length of the eye is too short compared with the focal length of the optical components of the eye, that is, the eye does not grow enough.

Myopia has a high prevalence rate in many regions of the world. Of greatest concern with this condition is its possible progression to high myopia, for example greater than five (5) diopters, which dramatically affects one's ability to function without optical aids. High myopia is also associated with an increased risk of retinal disease, cataract, and glaucoma.

Corrective lenses are used to alter the gross focus of the eye to render a clearer image at the retinal plane, by shifting the focus from in front of the retinal plane to correct myopia, or from behind the retinal plane to correct hyperopia, respectively. However, the corrective approach to the conditions does not address the cause of the condition, but is merely prosthetic or for treating the symptoms of the condition.

Most eyes do not have simple myopia or hyperopia, but may also have more complex optical errors such as myopic astigmatism or hyperopic astigmatism. Astigmatic errors of focus cause the image of a point source of light to form as two mutually perpendicular lines at different focal distances along two principal meridians. In the foregoing discussion, the terms myopia and hyperopia are used to include simple myopia or myopic astigmatism and hyperopia and hyperopic astigmatism respectively.

Emmetropia describes the state of clear vision where an object at optical infinity is in relatively sharp focus with the eye lens relaxed. In normal or emmetropic adult eyes, light from both distant and close objects and passing though the central or paraxial region of the aperture or entrance pupil is focused by the cornea and crystalline lens inside the eye close to the retinal plane where the inverted image is sensed. It is observed, however, that most normal eyes exhibit a positive longitudinal spherical aberration, generally in the region of about +0.50 diopters (D) for a 5 mm aperture, meaning that rays passing through the margin of an aperture or pupil are focused +0.50 D in front of the retinal plane when the eye is focused to optical infinity. As used herein the measure D is the dioptric power, defined as the reciprocal of the focal distance of a lens or optical system, in meters, along an optical axis. Also as utilized herein, the term "add" shall be defined as an additional plus power to assist in seeing more clearly at near distances.

The spherical aberration of the normal eye is not constant. For example, accommodation, that is, the change in optical power of the eye derived primarily though change to the internal crystalline lens causes the spherical aberration to change from positive to negative.

Myopia typically occurs due to excessive axial growth or elongation of the eye. It is now generally accepted, primarily from animal research, that axial eye growth can be influenced by the quality and focus of the retinal image. Experiments performed on a range of different animal species, utilizing a number of different experimental paradigms, have illustrated that altering retinal image quality can lead to consistent and predictable changes in eye growth.

Furthermore, defocusing the retinal image in both chick and primate animal models, through positive lenses (myopic defocus) or negative lenses (hyperopic defocus), is known to lead to predictable, both in terms of direction and magnitude, changes in eye growth, consistent with the eyes growing to compensate for the imposed defocus. Emmetropisation is the process whereby eye growth is self-regulated to achieve an optimum match between the optics and axial length of the eye. The changes in eye length associated with optical blur have been shown to be modulated by changes in scleral growth. Blur with positive lenses, which leads to myopic blur and a decrease in scleral growth rate, results in the development of hyperopic refractive errors. Blur with negative lenses, which leads to hyperopic blur and an increase in scleral growth rate, results in development of myopic refractive errors. These eye growth changes in response to retinal image defocus have been demonstrated to be largely mediated through local retinal mechanisms, as eye length changes still occur when the optic nerve is damaged, and imposing defocus on local retinal regions has been shown to result in altered eye growth localized to that specific retinal region.

In humans there is both indirect and direct evidence that supports the notion that retinal image quality can influence eye growth. A variety of different ocular conditions, all of which lead to a disruption in form vision, such as ptosis, congenital cataract, corneal opacity, vitreous hemorrhage and other ocular diseases, have been found to be associated with abnormal eye growth in young humans, which suggests that relatively large alterations in retinal image quality do influence eye growth in human subjects. The influence of more subtle retinal image changes on eye growth in humans have also been hypothesized based on optical errors in the human focusing system during near work that may provide a stimulus for eye growth and myopia development in humans.

All published approaches for slowing myopia progression rely on the introduction of co-axial positive power regions, such as bifocals and/or multifocals, which compete with the primary distance correction region of the lens and results in a compromise to the distance visual acuity and contrast sensitivity.

Accordingly, there exists a need to achieve greater treatment efficacy in reducing and/or slowing myopia progression that enhances the impact of myopic blur without interfering with foveal image quality.

SUMMARY OF THE INVENTION

The contact lens with positive defocus, non-coaxial lenslets of the present invention overcomes the limitations of the prior art by ensuring better distance vision correction without compromising visual acuity and contrast sensitivity.

In accordance with one aspect, the present invention is directed to an ophthalmic lens for at least one of slowing, retarding or preventing myopia progression. The ophthalmic lens comprising a front convex surface, a back concave surface, an optic zone including primary base sphere distance correction zones and a plurality of non-coaxial lenslets with add power, the combination of non-coaxial lenslets and primary distance correction zones being arranged to provide clear vision and myopic defocus to all regions of the retina, and a peripheral zone surrounding the optic zone.

For coaxial or common axis optical elements, power is herein defined, in the usual manner, as the inverse of the focal length along the optical axis of the whole lens. For non-coaxial or individual axis optical elements, power is herein defined as the inverse of the focal length along the optical axis of the individual optical element and is also referred to as "local power." Defocus, whether coaxial or non-coaxial, is the power difference between the ideal focal length and the focal length of the optical element.

One way to achieve improved treatment efficacy is to design non-coaxial optics that enhance the impact of myopic blur in regulating eye growth without interfering with foveal image quality. With such designs, for each diopter of myopic defocus the retinal image quality is less degraded at the fovea and the focus of both sagittal and tangential powers are in front of the retina. An ophthalmic lens design with plano or negative distance power that provides optimal refractive correction, along with small islands of positive defocus, non-coaxial lenslets (myopic defocus zones) with local powers ranging from +1.00 to +30.00D, arranged in an optimal pattern and covering about twenty (20) to eighty (80) percent of the optical zone and/or central pupil area to deliver positive foci of light in front of the retina, with low impact on foveal image quality while slowing down the rate of myopia progression. The optimal pattern may comprise a circular or hexagon arrangement, a radial arrangement, an equally spaced or non-equally spaced arrangement, or any suitable arrangement, including combinations of the above arrangements.

The contact lenses of the present invention are designed to deliver a stop signal for myopic growth, i.e., myopic blur, irrespective of the pupil diameter and with no or little impact on visual performance. The non-coaxial lenslets with additional plus power comprising the contact lenses of the present invention overcome the limitations of the prior art by ensuring comparable or better distance vision correction than single vision lenses and/or astigmatic lenses with conventional add power for controlling myopia progression.

The present invention comprises an ophthalmic lens for at least one of slowing, retarding or preventing myopia progression. The ophthalmic lens includes, within its primary optical zone, multiple non-coaxial plus power zones. Each non-coaxial plus power zone is adjacent to a distance correction zone. This arrangement ensures that there is at least a distance correction zone and a non-coaxial plus power zone in any aperture/pupil size and viewing condition. The non-coaxial zones have a different local dioptric power than the base sphere coaxial power and/or cylinder power which correct the underlying refractive error. The ratio of the total area of the distance to non-coaxial plus power zones is 80:20 to 20:80 and preferably 40:60 to 60:40. The size of the non-coaxial plus power zones varies from 0.45 to 1 mm in diameter. It is not necessary that the whole optical zone consists of non-coaxial plus power zones and could be limited to the viewing area of the pupil. For pediatrics, typically pupil size ranges from 4 mm to 8 mm in mesopic conditions. Further, for optimum vision, the central region of the lens optical zone may be free of the non-coaxial plus power zones, leaving a primary distance correction.

The present invention is also directed to a method for at least one of slowing, retarding or preventing myopia progression by providing an ophthalmic lens having within its primary optical zone a series of annular concentric non-coaxial plus power zones. The zones alternating between primary distance co-axial correction concentric zones and non-coaxial plus power concentric zones. The non-coaxial circular zones having a different local dioptric power than the co-axial distance vision concentric zones. The ratio of the total area of the distance to non-coaxial plus power circular zone ranges from about 80:20 and 20:80. The space between the non-coaxial plus power zones or lenslets may be used to create a plano focal plane or customized to provide the subject with optimal correction.

The prevalence of myopia, including high myopia, is increasing at an unprecedented rate throughout the world. The contact lens design of the present invention provides a simple, cost-effective and efficacious means and method for preventing and/or slowing myopia progression which, may help decrease the rate of high myopia. The lenses of the present invention are made from the same lens material as currently manufactured lenses utilizing the same manufacturing processes. Only the mold surfaces would be changed to incorporate the additional powers for the lenslets.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Experiments have shown that the eyes respond to hyperopic defocus that leads to axial elongation, therefore delivering higher plus powers to the central retina should slow myopia progression. However, just delivering higher plus power to the central retina may have a deleterious effect on vision. Accordingly, a contact lens with negative base power that provides optimal refractive correction for distance in combination with small areas or islands of positive power (lenslets) arranged in a particular pattern to deliver positive foci of light in front of the retina will provide the myopic defocus to inhibit myopia progression without impacting visual acuity and contrast sensitivity.

The present invention comprises an ophthalmic lens for at least one of slowing, retarding or preventing myopia progression. The ophthalmic lens includes, within its primary optical zone, multiple non-coaxial plus power zones. Each non-coaxial plus power zone is adjacent to a distance correction zone. This arrangement ensures that there is at least a distance and plus power non-coaxial zone in any viewing condition. The non-coaxial zones have a different local dioptric power than the base sphere power and/or cylinder power. The ratio of the total area of the distance to non-coaxial plus power zones is 80:20 to 20:80 and preferably 40:60 to 60:40. The size of the non-coaxial plus power zones varies from 0.45 to 1 mm in diameter. It is not necessary that the whole optical zone consists of non-coaxial plus power zones and could be limited to the viewing area of the pupil. For pediatrics, typically pupil size ranges from 4 mm to 8 mm in mesopic conditions. Further, for optimum vision, the central 2 mm of the lens optical zone may be free of the non-coaxial myopic defocus zones, leaving a primary distance correction.

Figure 1:
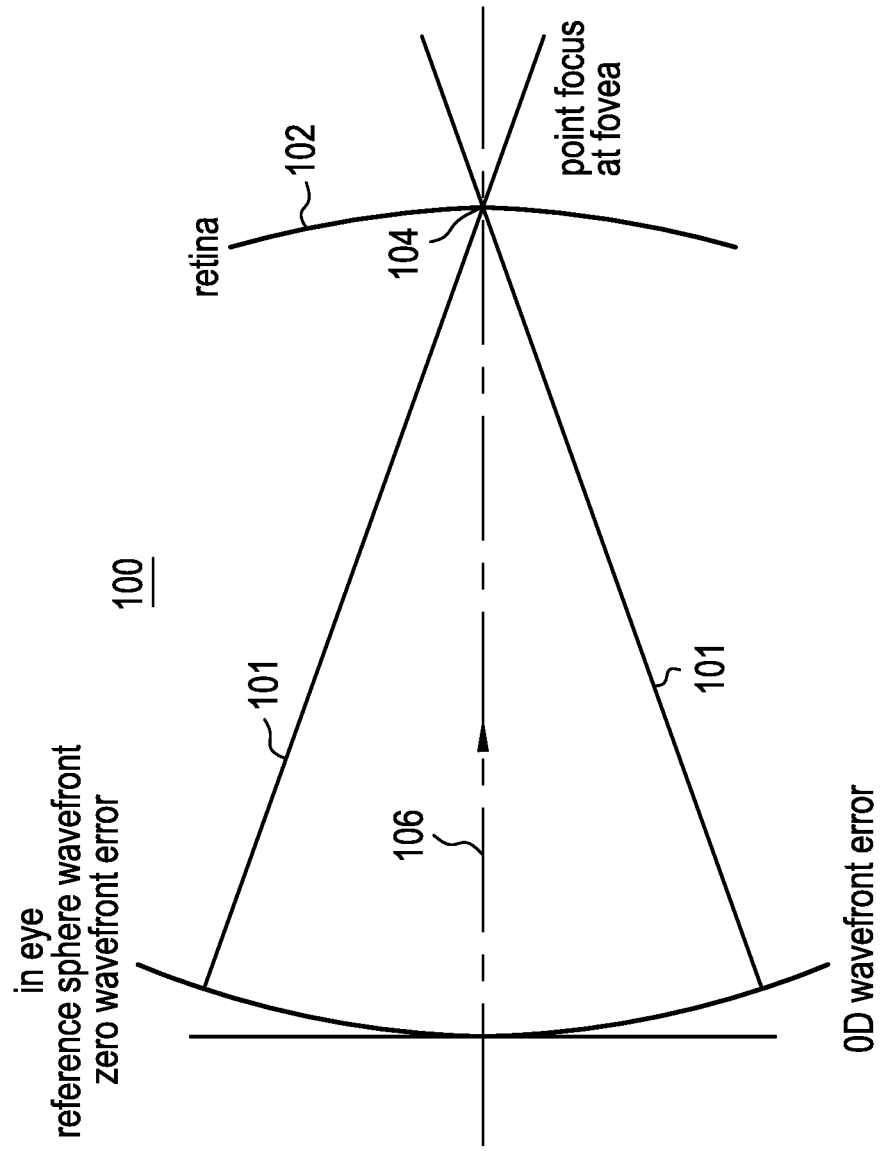
FIG. 1 is a diagrammatic representation of a 0 diopter wavefront traveling through the eye towards the retina.
Figure 2:
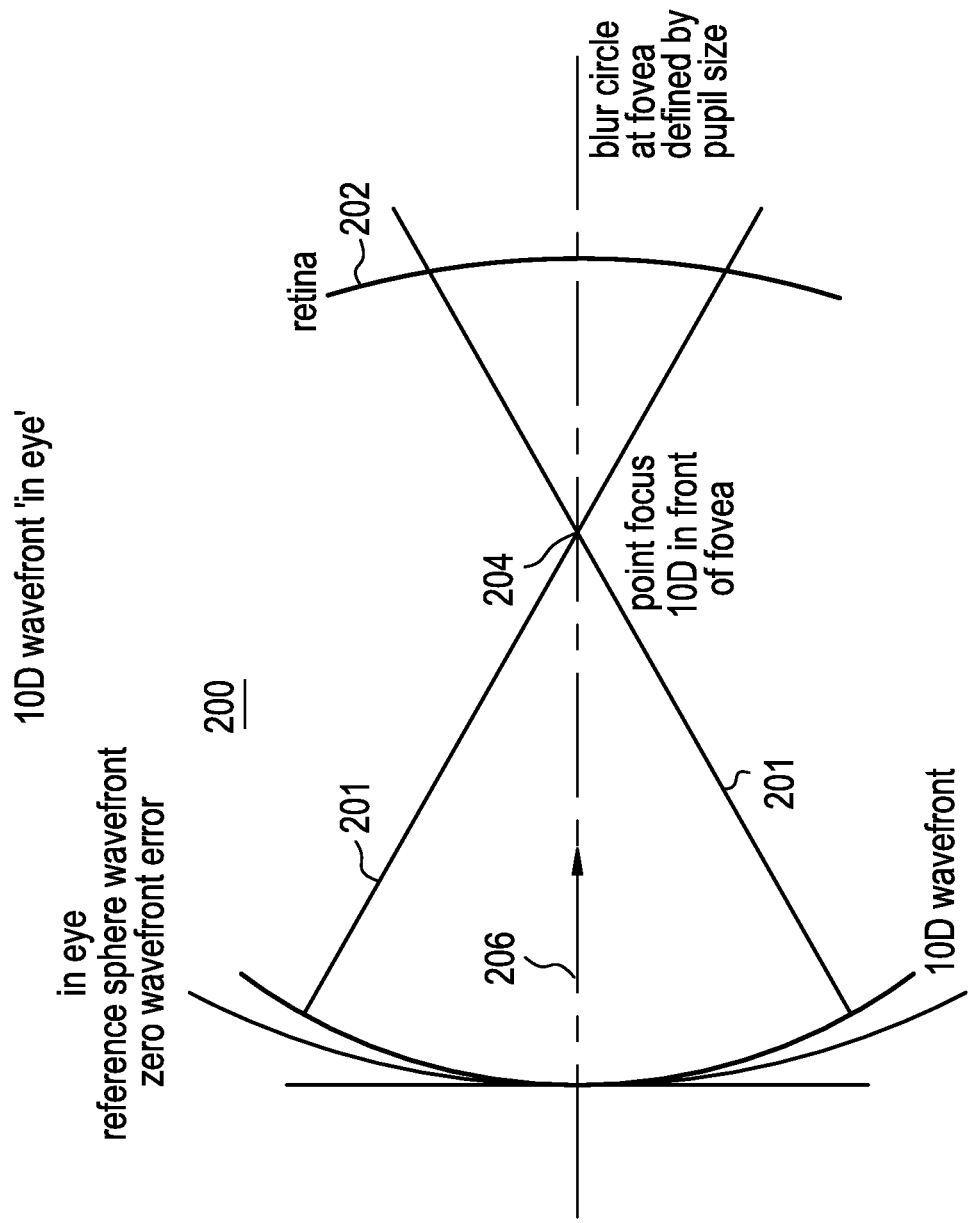
FIG. 2 is a diagrammatic representation of a +10.00 diopter wavefront travelling through the eye towards the retina.

Referring to FIG. 1, there is illustrated a plane (0 diopter defocus) wavefront 101 as it would travel through the eye 100 towards the retina 102 of the eye 100. As illustrated, assuming the eye has zero wavefront aberrations, the plane wavefront focuses at a single point 104 along the optical axis 106. Given that this is a 0 wavefront error representation, the focal point 104 is on the fovea which is located in the center of the macula lutea of the retina 102. The fovea is the area of the retina responsible for sharp central vision. In contrast, in FIG. 2, there is illustrated a +10.00 diopter wavefront 201 as it would travel through the eye 200 towards the retina 202 of the eye 200. As illustrated, the wavefront focuses at a single point 204 along the optical axis 206 in front of the retina 202 as would be expected with a +10.00 diopter defocus. In both cases, and similar to conventional spherical optics, the optics of the lenses are designed with a primary optical axis through which the light rays converge towards a single point; namely, the focal point. The amount of spherical wavefront error dictates the location of the focal point, on or in front of the fovea of the retina, as the examples illustrate in FIGS. 1 and 2 respectively. These two figures are utilized to set the basic parameters/principles upon which the description of the present invention is based; however, it should be understood that while only spherical refractive errors are illustrated and described for ease of explanation, the present invention is equally applicable to toric lenses which include cylindrical powers at a specific axis. In addition, as set forth in greater detail subsequently, the lenslets may include a cylinder power and axis, and they may also comprise more complex optical designs such as higher order aberrations.

Figure 3:
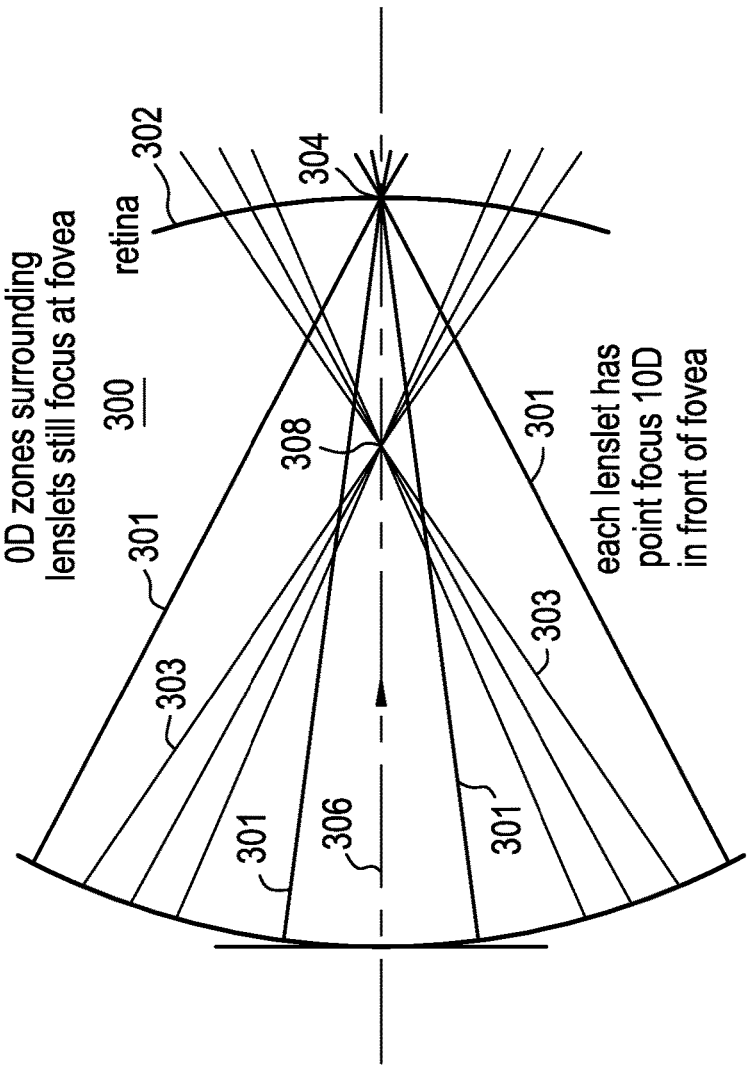
FIG. 3 is a diagrammatic representation of a 0 diopter with sections of +10.00 diopter coaxial wavefront travelling through the eye towards the retina.

FIG. 3 illustrates a plano (0 diopter defocus) wavefront 301 and coaxial lenslet wavefronts with +10.00 diopter defocus 303 as they would travel through the eye 300 towards the retina 302 of the eye 300. As illustrated, the 0 diopter base sphere wavefront focuses at a single point 304 along the primary optical axis 306. Given that this is a 0 wavefront error representation, the focal point 304 is on the fovea of the retina 302. The wavefront from +10.00 diopter coaxial lenslet 303 each focus at a single point 308 in front of the retina 302 as would be expected with a +10.00 diopter error. It should be noted that the lenslets are a small section of the +10.00 diopter wavefront illustrated in FIG. 2 and thus the light rays 303 from each lenslet still point in the same direction as the full +10.00 diopter wavefront. Concentric or aspheric multifocal lens designs also usually have both primary distance and add power having a common axis. Typically, in these applications to maintain optimum image quality, the add power is limited to a range of +1.00 to +3.00 diopters. Therefore, the high add power required for the present invention would not work with this arrangement of lenslets, but rather with a non-coaxial arrangement, as set forth in detail subsequently.

Figure 4:
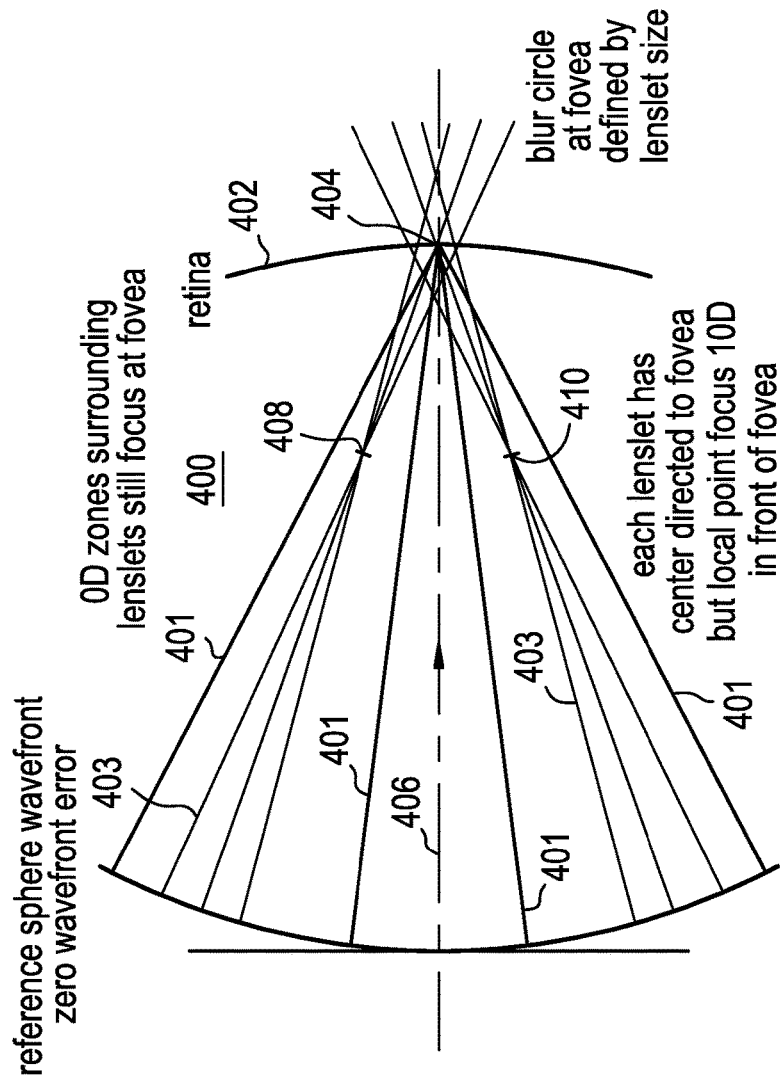
FIG. 4 is a diagrammatic representation of a 0 diopter with sections of +10.00 diopter non-coaxial wavefront travelling through the eye and focused in front of the retina and towards the fovea.

FIG. 4 illustrates a plane wavefront from a plano base sphere lens 401 and wavefronts from +10.00 diopter non-coaxial lenslets 403 as they would travel through the eye 400 towards the retina 402 of the eye 400. As illustrated, the plane wavefront 401 focuses at a single point 404 along the primary optical axis 406. Given that this is a 0 diopter wavefront error representation, the focal point 404 is on the fovea of the retina 402. The non-coaxial lenslet wavefronts with +10.00 diopter defocus 403 each focus at a single point 408 and 410 in front of the retina 402 as would be expected with a +10.00 diopter lens, but in a direction towards the fovea. Unlike what is illustrated in FIG. 3, the lenslets now have focal points 408 and 410 that do not coincide with the original common optical axis 406 and are therefore non-coaxial. It is important to note that the spherical wavefront lenslets focus +10.00 diopters in front of the retina 402 along their own axis, the center of each lenslet has 0 wavefront error, and either side of the center point thereof has an opposite slope and therefore still points in the same direction as the reference sphere center; namely, the fovea.

Figure 5:
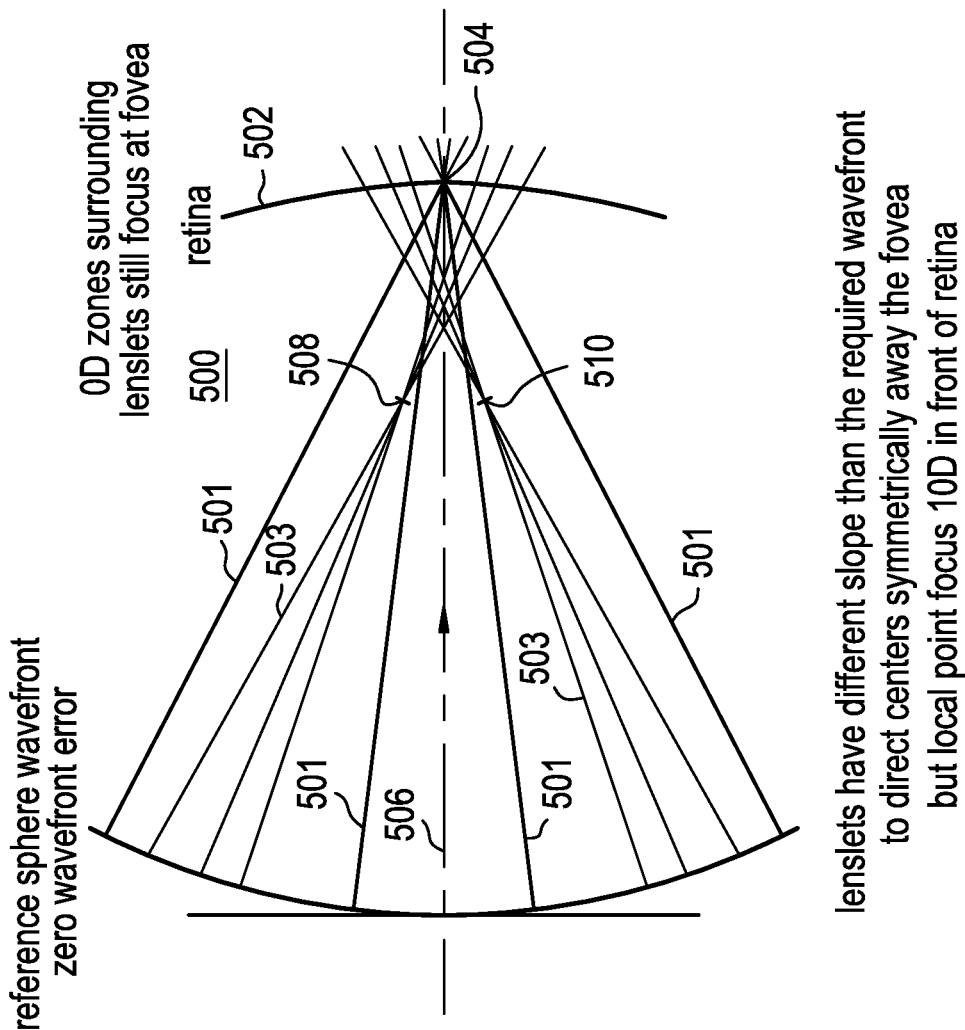
FIG. 5 is a diagrammatic representation of a 0 diopter with sections of +10.00 diopter non-coaxial wavefront travelling through the eye and focused in front of the retina but symmetrically away from the fovea.

FIG. 5 illustrates a plane wavefront from a plano base sphere lens 501 and wavefronts from +10.00 diopter non-coaxial lenslets 503 as they would travel through the eye 500 towards the retina 502 of the eye 500. As illustrated, the plane wavefront focuses at a single point 504 along the primary optical axis 506. Given that this is a 0 diopter wavefront error representation, the focal point 504 is on the fovea of the retina 502. The non-coaxial lenslet wavefronts with +10.00 diopter defocus 503 each focus at a single point 508 and 510 in front of the retina 502 as would be expected with a +10.00 diopter lens, but symmetrically away from the fovea. Once again, the lenslets now have focal points 508 and 510 that do not coincide with the original common optical axis 506 and are therefore non-coaxial. It is important to note that the spherical wavefront lenslets focus along their own axis and have different slopes than the lenslets of FIG. 4 to direct the centers symmetrically away from the fovea but still have a local point focus of +10.00 diopters in front of the retina 502. In addition, the lenslet axes converge symmetrically towards the central base sphere wavefront axis 506. In other words, the lenslets 512 direct light rays across the original common optical axis 506 towards peripheral sections of the retina 502 equidistant from the fovea, a symmetrical arrangement.

Figure 6:
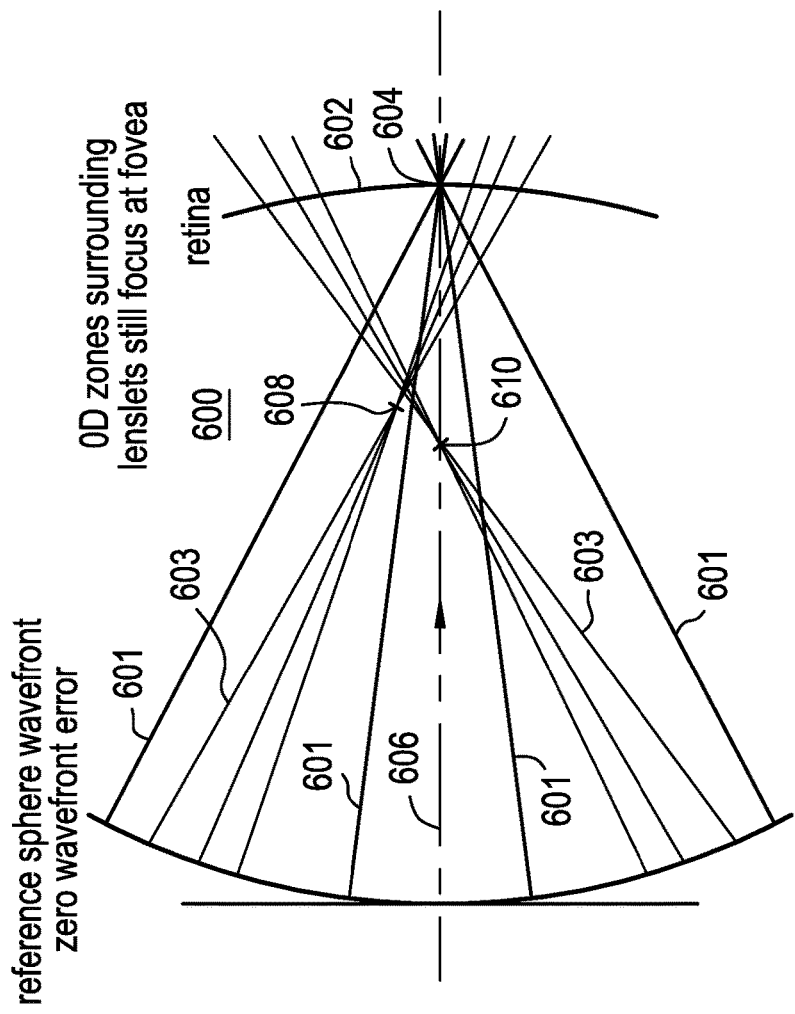
FIG. 6 is a diagrammatic representation of a 0 diopter with sections of +10.00 diopter non-coaxial wavefront travelling through the eye and focused in front of the retina but asymmetrically away from the fovea.

FIG. 6 illustrates a plane wavefront from a plano base sphere lens 601 and wavefronts from +10.00 diopter non-coaxial lenslets 603 as they would travel through the eye 600 towards the retina 602 of the eye 600. As illustrated, the plane wavefront focuses at a single point 604 along the primary optical axis 606. Given that this is a 0 diopter wavefront error representation, the focal point 604 is on the fovea of the retina 602. The non-coaxial lenslet wavefronts with +10.00 diopter defocus 603 each focus at a single point 608 and 610 in front of the retina 602 as would be expected with a +10.00 diopter lens, but asymmetrically away from the fovea. Once again, the lenslets now have focal points 608 and 610 that do not coincide with the original common axis 606 and are therefore non-coaxial. It is important to note that the spherical wavefront lenslets focus along their own axis and have different slopes than the lenslets of FIG. 4 to direct centers asymmetrically away from the fovea but still have a local point focus of +10.00 diopters in front of the retina 602. In addition, the lenslet axes converge asymmetrically in front of the central base sphere wavefront focal point. In other words, the lenslets direct light rays across the original common optical axis towards peripheral sections of the retina 602 different distances from the fovea, an asymmetrical arrangement.

Figure 7:
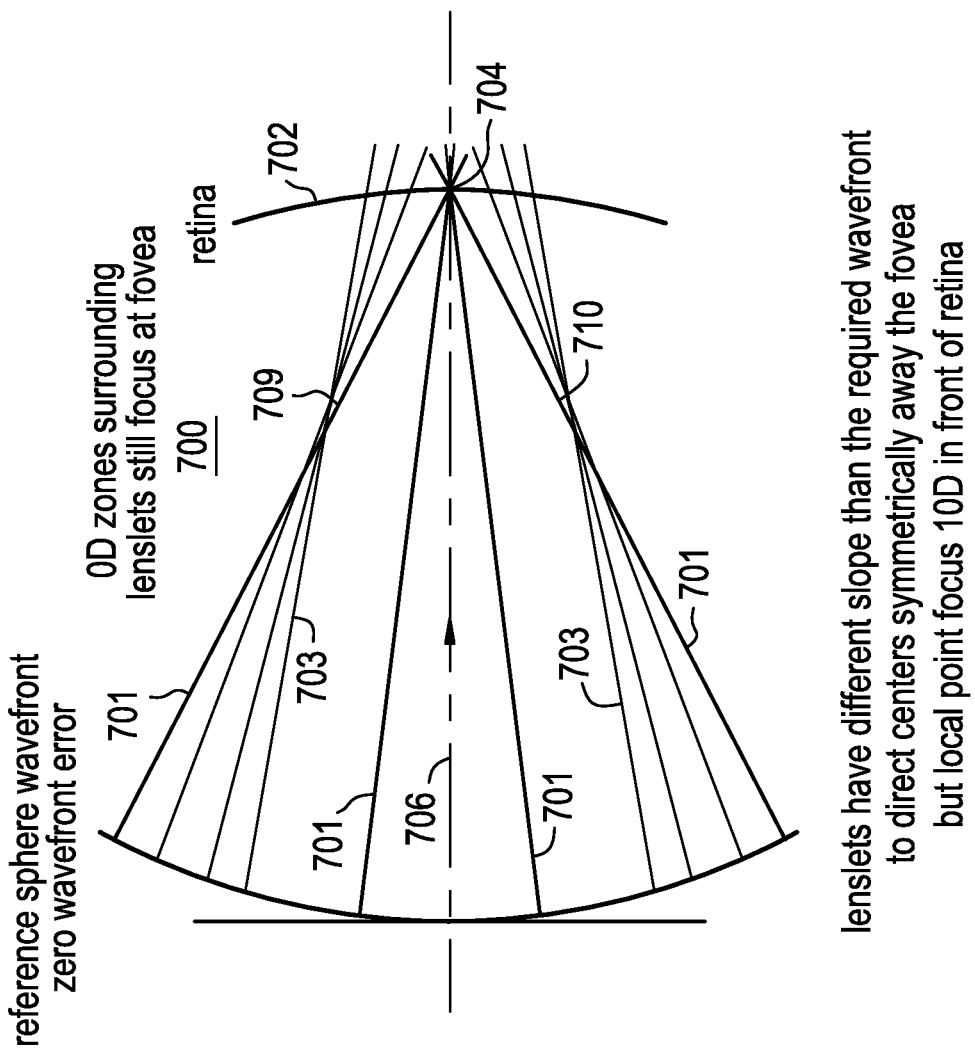
FIG. 7 is a diagrammatic representation of a 0 diopter with sections of +10.00 diopter non-coaxial wavefront travelling through the eye and focused in front of the retina but symmetrically away from the fovea without crossing the coaxial primary optical axis.

FIG. 7 illustrates a plane wavefront from a plano base sphere lens 701 and wavefront +10.00 diopter non-coaxial lenslets 703 as they would travel through the eye 700 towards the retina 702 of the eye 700. As illustrated, the plane wavefront focuses at a single point 704 along the primary optical axis 706. Given that this is a 0 diopter wavefront error representation, the focal point 704 is on the fovea of the retina 702. The non-coaxial lenslet wavefronts with +10.00 diopter defocus 703 each focus at a single point 708 and 710 in front of the retina 702 as would be expected with a +10.00 diopter lens, but symmetrically away from the fovea without crossing the primary optical axis 706. Once again, the lenslets now have focal points 708 and 710 that do not coincide with the original common axis 706 and are therefore non-coaxial. It is important to note that the spherical wavefront lenslets focus along their own axis and have different slopes than the lenslets of FIG. 4 to direct centers symmetrically away from the fovea but still have a local point focus of +10.00 diopters in front of the retina 702. In addition, the lenslet axes converge symmetrically behind the central base sphere wavefront focal point 704. In other words, the lenslets direct light rays that do not cross the original common optical axis 706 but still are directed towards peripheral sections of the retina 702 that are equidistant from the fovea, a symmetrical arrangement.

Figure 8:
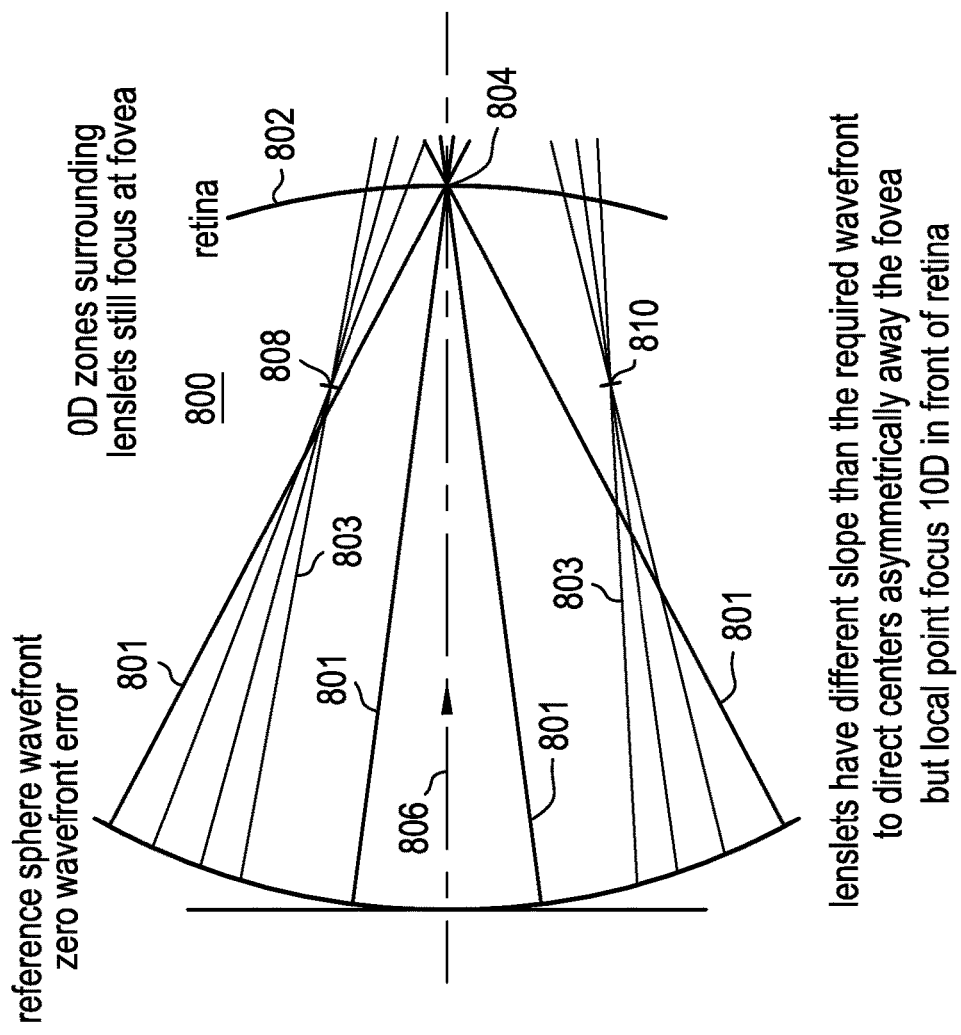
FIG. 8 is a diagrammatic representation of a 0 diopter with sections of +10.00 diopter non-coaxial wavefront travelling through the eye and focused in front of the retina but asymmetrically away from the fovea without crossing the coaxial primary optical axis.

FIG. 8 illustrates a plane wavefront from a plano base sphere lens 801 and wavefronts from +10.00 diopter non-coaxial lenslet 803 as they would travel through the eye 800 towards the retina 802 of the eye 800. As illustrated, the plane wavefront focuses at a single point 804 along the primary optical axis 806. Given that this is a 0 diopter wavefront error representation, the focal point 804 is on the fovea of the retina 802. The non-coaxial lenslet wavefronts with +10.00 diopter defocus 803 each focus at a single point 808 and 810 in front of the retina 802 as would be expected with a +10.00 diopter lens, but asymmetrically away from the fovea without crossing the primary optical axis 806. Once again, the lenslets now have focal points 808 and 810 that do not coincide with the original common axis 806 and are therefore non-coaxial. It is important to note that the spherical wavefront lenslets focus along their own axis and have different slopes than the lenslets of FIG. 4 to direct centers asymmetrically away from the fovea but still have a local point focus of +10.00 diopters in front of the retina 802. In addition, the lenslet axes converge asymmetrically behind the central base sphere wavefront axis 806. In other words, the lenslets direct light rays that do not cross the original common optical axis 806 inside the eye, but still are directed towards peripheral sections of the retina 802 that are different distances from the fovea, an asymmetrical arrangement.

It is important to note that combinations of the above described configurations are also possible, for example, an optical design which includes a base sphere with zero wavefront error, lenslets that direct rays across the primary optical axis, and lenslets that direct rays to the same side of the primary optical axis. In addition, the lenslets may easily be created in shapes that are non-spherical. This would allow fine tuning and manipulation of the distribution of rays coming from the lenslets and striking the retina. One example would be creating lenslets with local astigmatism matching their angular position. The amount of astigmatism could be tuned to change the width of the retinal blur in a 'ring' pattern around the fovea.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability values and are generally more comfortable to wear than the contact lenses made of the earlier hard materials. Rigid gas permeable hard contact lenses, on the other hand, are made from siloxane-containing polymers but are more rigid than soft contact lenses and thus hold their shape and are more durable.

Currently available contact lenses remain a cost effective means for vision correction. The thin plastic lenses fit over the cornea of the eye to correct vision defects, including myopia or nearsightedness, hyperopia or farsightedness, astigmatism, i.e. toricity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn continuously for a period of up to thirty days. Colored soft contact lenses use different materials to provide different functionality. For example, a visibility tint contact lens uses a light tint to aid the wearer in locating a dropped contact lens, enhancement tint contact lenses have a transparent or translucent tint that is meant to enhance one's natural eye color, the color tint contact lens comprises an opaque tint meant to change one's eye color, and the light filtering tint contact lens functions to enhance certain colors while muting others. Bifocal and multifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Figure 12A:
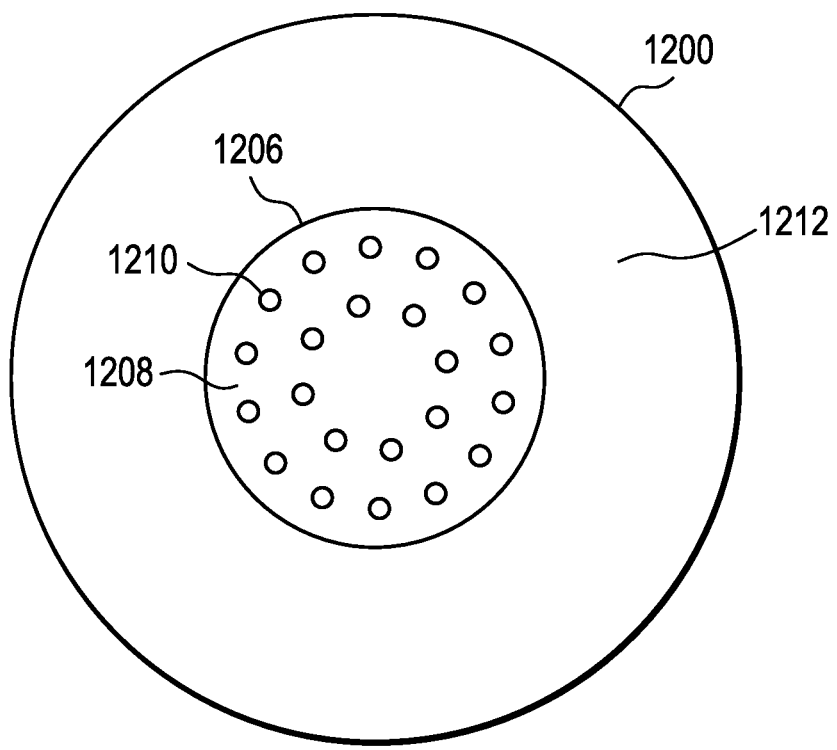
FIG. 12A is a diagrammatic top view of a contact lens in accordance with the present invention.
Figure 12B:
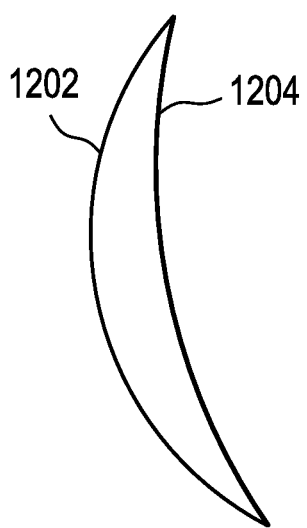
FIG. 12B is a diagrammatic side view of a contact lens in accordance with the present invention.

According to the present invention, lenslet designs are developed for ophthalmic lenses that provide foveal vision correction, and have myopic blur in the near and far retinal periphery to reduce or stop the eye growth signal with minimal or no impact on primary vision. The contact lens of the present invention may be a spherical lens or a toric lens. FIGS. 12A and 12B illustrate an exemplary contact lens 1200 that may be utilized in accordance with the present invention. FIG. 12A is a planar top view of the lens 1200 and FIG. 12B is a side view of the lens 1200. The contact lens 1200 comprises a front convex surface 1202 and a back concave surface 1204. The optic zone 1206 comprises primary distance correction optics 1208 and a plurality of non-coaxial lenslets 1210 with high add power to create myopic defocus for the treatment of myopia progression. The ratio of the total area of the primary distance correction optics 1208 to the non-coaxial lenslets 1210 may range from 20:80 to 80:20. The lenslets 1210 may be formed on the front convex surface 1202 or the back concave surface 1204. Preferably, the lenslets 1210 are formed on the front convex surface 1202. The contact lens 1200 also comprises a peripheral zone 1212.

Figure 9:
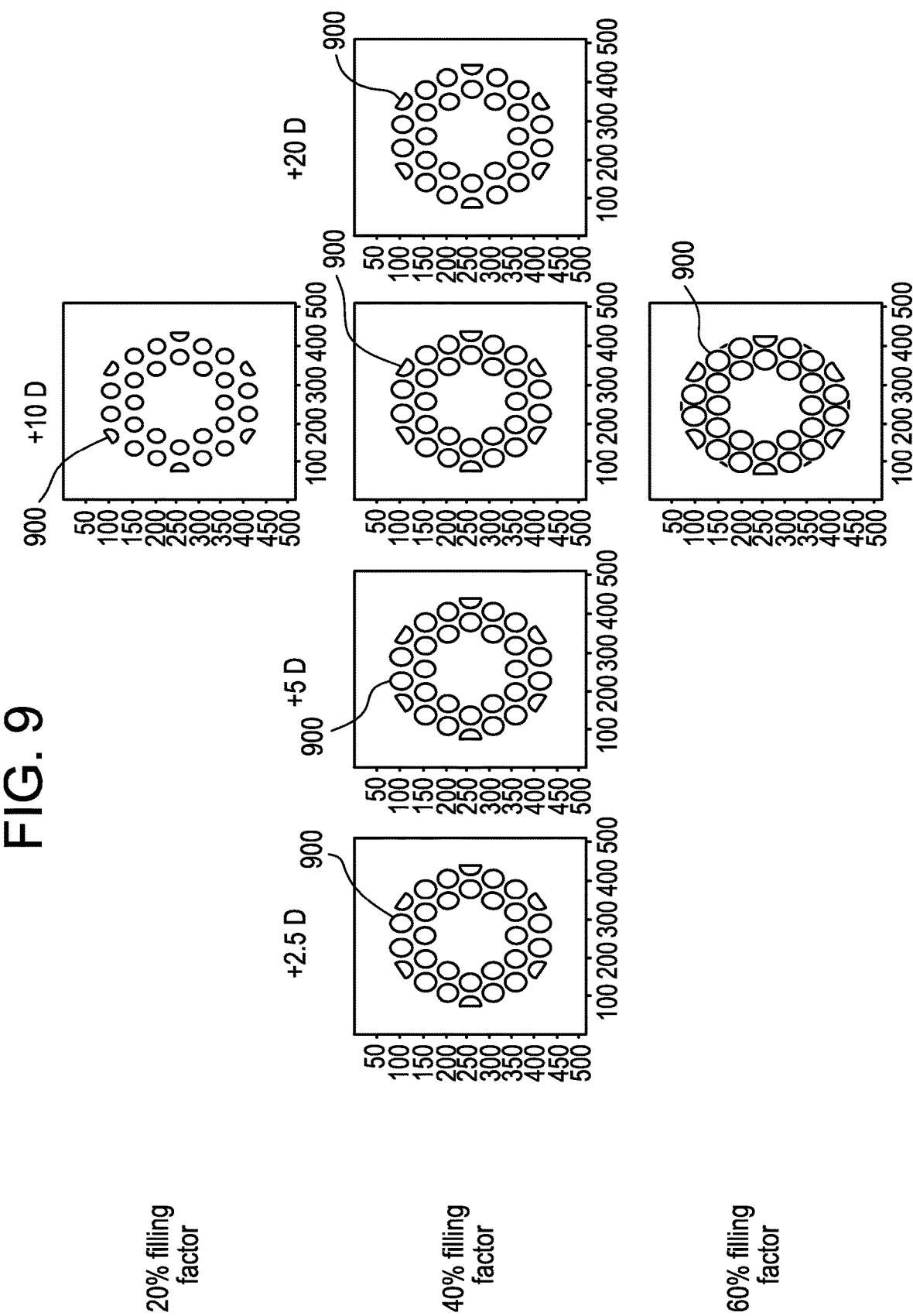
FIG. 9 is a diagrammatic representation of a first set of exemplary non-coaxial lenslet designs in accordance with the present invention.

FIG. 9 illustrates six exemplary embodiments of non-coaxial lenslet designs for a 5.5 mm pupil aperture, where variations of the ratio of distance to plus power area or filling factor ranges from twenty (20) to sixty (60) percent, and the plus power value from +2.50 diopters to +20.0 diopters. In these examples the sizes of the lenslets 900 are 0.45 mm, 0.62 mm and 0.77 mm for the 20 percent, 40 percent, and 60 percent filling factors, respectively. The distance from lenslet center to lenslet center was held constant at 0.88 mm. The clear center diameter was also held constant at 2.00 mm. It is important to note that any suitable arrangement of lenslets 900 may be utilized. In addition, any suitable shape and size may be utilized for the lenslets 900, for example, circular, hexagonal, concentric rings or even radial zones with a size ranging from 0.5 to 1.1 mm. Table 1 given below summarizes design parameters for the above examples.

TABLE 1

| Design Example # | Clear Center Diameter (mm) | Pupil Aperture (mm) | % Fill Factor | Distance Between Lenslets (D) | Distance Refraction (mm) | Add Power (D) (Myopic Power) |
|---|---|---|---|---|---|---|
| 1 | 2.0 | 5.5 | 20 | 0.88 | 0.00 | +10 |
| 2 | 2.0 | 5.5 | 40 | 0.88 | 0.00 | +2.5 |
| 3 | 2.0 | 5.5 | 40 | 0.88 | 0.00 | +5 |
| 4 | 2.0 | 5.5 | 40 | 0.88 | 0.00 | +10 |
| 5 | 2.0 | 5.5 | 40 | 0.88 | 0.00 | +20 |
| 6 | 2.0 | 5.5 | 60 | 0.88 | 0.00 | +10 |

The visual performance and Weber contrast sensitivity for the above non-coaxial lenslet designs relative to a best spherical correction and in comparison to a conventional +3.00 diopter sphere lens, a two zone bifocal lens with a +3.00 diopter add, or a conventional concentric ring bifocal with a +2.00 diopter add is summarized in Table 2 given below. In all cases, the lenslet design with non-coaxial optical lenslets, resulted in less visual acuity loss and Weber contrast sensitivity loss when compared to conventional coaxial optical approaches such as the two zone and concentric bifocal lenses. Contrast is essentially the difference in luminance/brightness that makes an object or objects within the field of view distinguishable and the Weber contrast sensitivity is basically the eye's detection threshold between object luminance and background luminance.

TABLE 2

| Design Type | Fill Factor at 5.5 mm Pupil | Add Power/ Hyperopic Power (D) | VSOTF | Lenslet Size | Loss of Visual Acuity logMAR Mean/std (N = 5) | Loss of Weber Contrast Sensitivity Mean/std (N = 5) |
|---|---|---|---|---|---|---|
| +3.00D Conventional Sphere | 100% | NA | 0.001 | NA | 0.81 ± 0.06 | NA |
| Concentric Bifocal | 50% | 2.0 | NA | NA | 0.07 ± 0.02 | 0.04 ± 0.02 |
| Two Zone | 85% | 3.0 | NA | NA | 0.08 ± 0.01 | 0.05 ± 0.01 |
| Example 1 | 20% | 10.0 | 0.6332 | 0.45 mm | 0.02 ± 0.01 | 0.02 ± 0.02 |
| Example 2 | 40% | 2.5 | 0.5375 | 0.62 mm | 0.02 ± 0.04 | 0.01 ± .01 |
| Example 3 | 40% | 5.0 | 0.5277 | 0.62 mm | 0.03 ± 0.04 | 0.03 ± 0.02 |
| Example 4 | 40% | 10.0 | 0.5083 | 0.62 mm | 0.04 ± 0.04 | 0.03 ± 0.01 |
| Example 5 | 40% | 20.0 | 0.4952 | 0.62 mm | 0.05 ± 0.05 | 0.03 ± 0.01 |
| Example 6 | 60% | 10.0 | 0.3720 | 0.77 mm | 0.04 ± 0.02 | 0.02 ± 0.02 |

Figure 10:
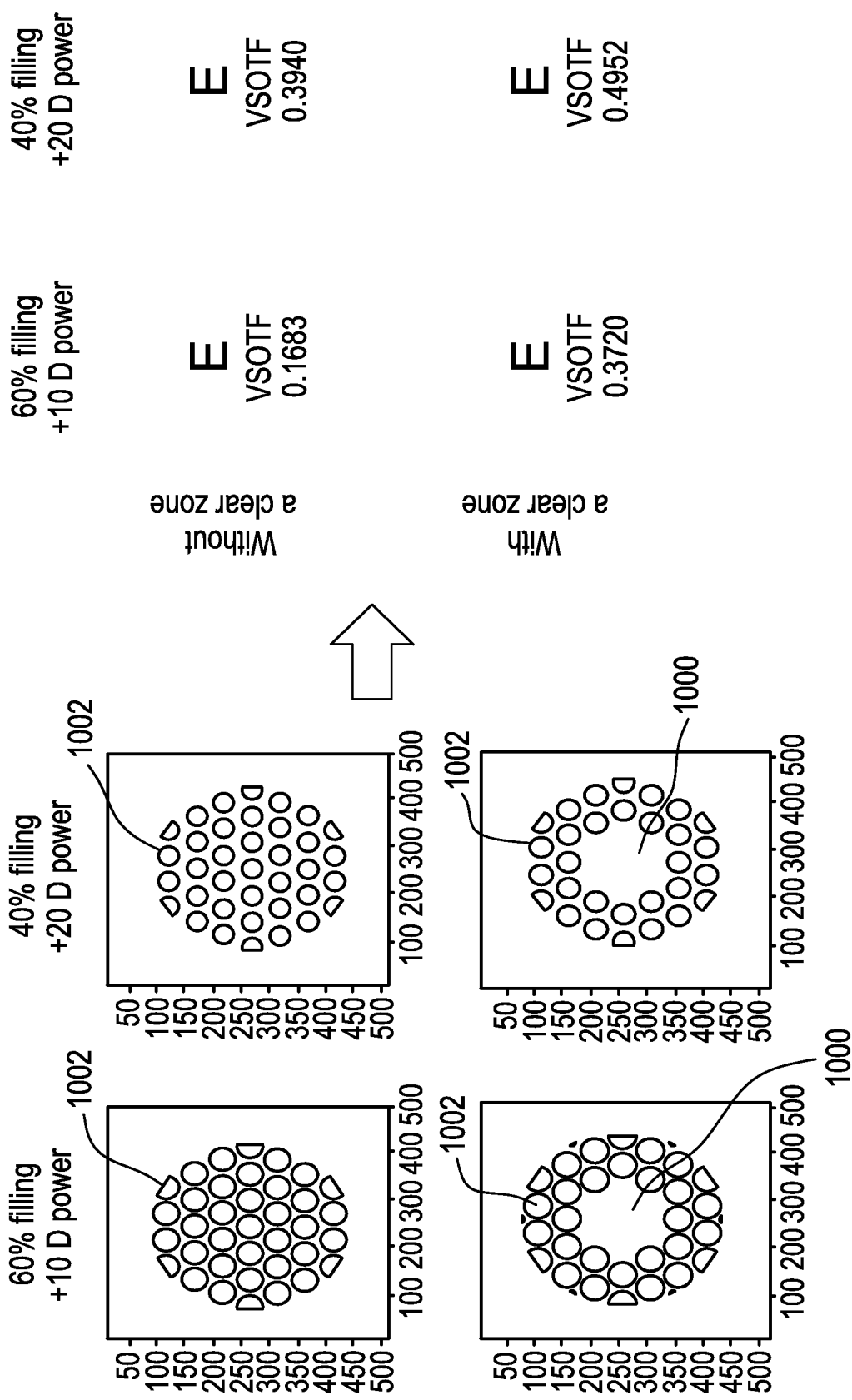
FIG. 10 is a diagrammatic representation of a second set of exemplary non-coaxial lenslet designs in accordance with the present invention.

In accordance with another exemplary embodiment of the present invention, FIG. 10, illustrates a variation of the optical design with and without a clear central zone, while maintaining constant the percent fill factor, add power and lenslet size. As illustrated, the optical design with a clear central zone 1000 does not have lenslets 1002 therein. The parameters of the designs, and calculated visual performance (VSOTF) for each of the design examples are summarized in Table 3 given below.

The visual Strehl ratio based on the optical transfer function (VSOTF) is a commonly used descriptor of visual performance that can be directly derived from wavefront aberrations. It indicates how retinal image quality is affected by the optics of the eye and other aberrations induced by different forms of additional vision aids (e.g. spectacles or contact lenses, etc.). The augmented VSOTF is given by the following equation, $$VSOTF = \frac{\int_{-\infty}^{\infty}\int_{-\infty}^{\infty} CSF_N(f_x, f_y) \cdot |Re\{OTF(f_x, f_y)\}| \, df_x df_y}{\int_{-\infty}^{\infty}\int_{-\infty}^{\infty} CSF_N(f_x, f_y) \cdot OTF_{DL}(f_x, f_y) \, df_x df_y},$$

where $OTF_{DL}(f_x, f_y)$ denotes the diffraction limited optical transfer function, $CSF_N(f_x, f_y)$ is the neural contrast sensitivity function, and $(f_x, f_y)$ are the spatial frequency coordinates.

TABLE 3

| Design Example # | Clear Center Diameter (mm) | Pupil Aperture (mm) | % Fill Factor | Distance Between Lenslets (D) | Distance Refraction (mm) | Add Power (D) (Myopic Power) | VSOTF |
| --- | --- | --- | --- | --- | --- | --- | --- |
| 1 | NA | 5.5 | 60 | 0.88 | 0.00 | +10 | 0.1683 |
| 2 | 2 | 5.5 | 60 | 0.88 | 0.00 | +10 | 0.3720 |
| 3 | NA | 5.5 | 40 | 0.88 | 0.00 | +20 | 0.3940 |
| 4 | 2 | 5.5 | 40 | 0.88 | 0.00 | +20 | 0.4952 |

Figure 11:
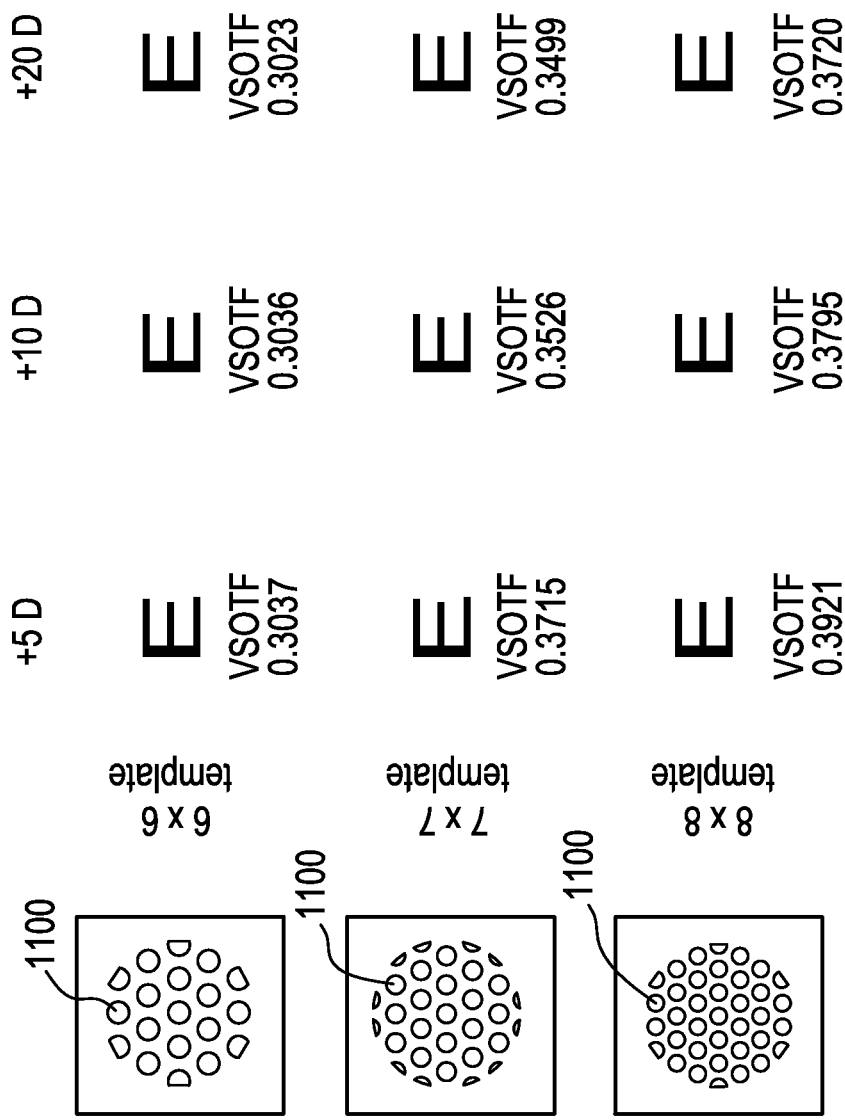
FIG. 11 is a simulated retinal image in a diffraction limited model eye on image quality and visual performance as a function of lenslet size and add power.

In accordance with yet another exemplary embodiment of the present invention, FIG. 11 illustrates simulated retinal images in a diffraction limited model eye on image quality and visual performance as a function of lenslet 1100 size and add power. Table 4, given below, summarizes the design parameters and calculated visual performance for each of the designs. It may be seen from the data in Table 4 that add power has less of an impact on VSOTF than does lenslet size. Accordingly, optimum design parameters may include high add for enhanced treatment efficacy, small lenslet size and a clear center.

TABLE 4

| Design Example # | Pupil Aperture (mm) | % Fill Factor | Lenslet Diameter (mm) | Add Power (D) | VSOTF | Add Power (D) | VSOTF | Add Power (D) | VSOTF |
| --- | --- | --- | --- | --- | --- | --- | --- | --- | --- |
| 1 | 5.5 | 40 | 0.9 | +5 | 0.3037 | +10 | 0.3036 | +20 | 0.3023 |
| 2 | 5.5 | 40 | 0.8 | +5 | 0.3715 | +10 | 0.3526 | +20 | 0.3499 |
| 3 | 5.5 | 40 | 0.7 | +5 | 0.3921 | +10 | 0.3795 | +20 | 0.3720 |

It is important to note that while the exemplary embodiments described herein have been directed to contact lenses that comprise lenslets having the same local power, whether it be +1.00D or +30.00D, it is possible to have contact lenses comprising lenslets of different powers. For example, a contact lens may comprise lenslets with a local power of +2.00D in one region and +10.00D or +20.00D in another region. In yet still other exemplary embodiments, the local powers may change in an alternating fashion with their neighboring lenslets. Essentially, any suitable combination of local powers may be utilized.

It is also important to note that the exemplary embodiments described herein have been directed to contact lenses, to slow myopia progression. Those lenses comprise a plano or negative base sphere power for distance correction and non-coaxial lenslets with positive add power to induce myopic blur. It is also possible to have contact lenses for hyperopic subjects with reversed polarity. In these lenses, the base spherical correction is a plus power refractive correction with non-coaxial lenslets having negative power to induce hyperopic blur leading to emmetropia.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A contact lens for at least one of slowing, retarding or preventing myopia progression, the contact lens comprising:
  a front convex surface;
  a back concave surface sized and shaped to be placed against an eye of a patient;
  an optic zone including primary base sphere distance correction zones and a plurality of individual lenslets with add power of at least +10 diopters and each having a diameter of between 0.45 and 1 mm and interspersed between and adjacent to the primary base sphere distance correction zones, the optic zone comprises a central region having a diameter of less than 2 mm that is clear of lenslets and surrounding region having lenslets, wherein in said surrounding region the plurality of lenslets with add power occupy between 20 and 60 percent of the surrounding region, the primary base sphere distance correction zones create a wavefront that focuses at a single point along a primary optical axis of the lens and on the retina and the plurality of lenslets with add power create non-coaxial wave-fronts that focus on a single point in front of the retina at a location not on the primary optical axis, and wherein a center of said non-coaxial wave-fronts are directed away from the fovea, the combination of lenslets and primary distance correction zones being arranged within the optic zone to provide clear vision and myopic defocus to all regions of the retina with the ratio of the total area of the primary base sphere distance correction zones to the lenslets ranges between 20 to 60 and 60 to 20; and a peripheral zone surrounding the optic zone.

2. The contact lens according to claim 1, wherein the plurality of lenslets provide add power in the range of +10.00 to +30.00 diopters.

3. The contact lens according to claim 1, wherein the plurality of lenslets with add power are configured to create myopic blur around the fovea of a patient.

4. The contact lens according to claim 1, wherein the plurality of lenslets with add power are formed on the front convex surface.

5. The contact lens according to claim 1, wherein the plurality of lenslets with add power are formed on the back concave surface.

6. The contact lens according to claim 1, wherein the contact lens is a single vision spherical lens.

7. The contact lens according to claim 1, wherein the contact lens is a toric lens.

8. The contact lens according to claim 1, wherein the contact lens is soft contact lens.

9. The contact lens according to claim 1, wherein the plurality of lenslets with add power are spherical.

10. The contact lens according to claim 1, wherein the plurality of lenslets with add power are aspherical.

11. The contact lens according to claim 1, wherein the plurality of lenslets with add power are toric.

* * * * *